Figure 1:
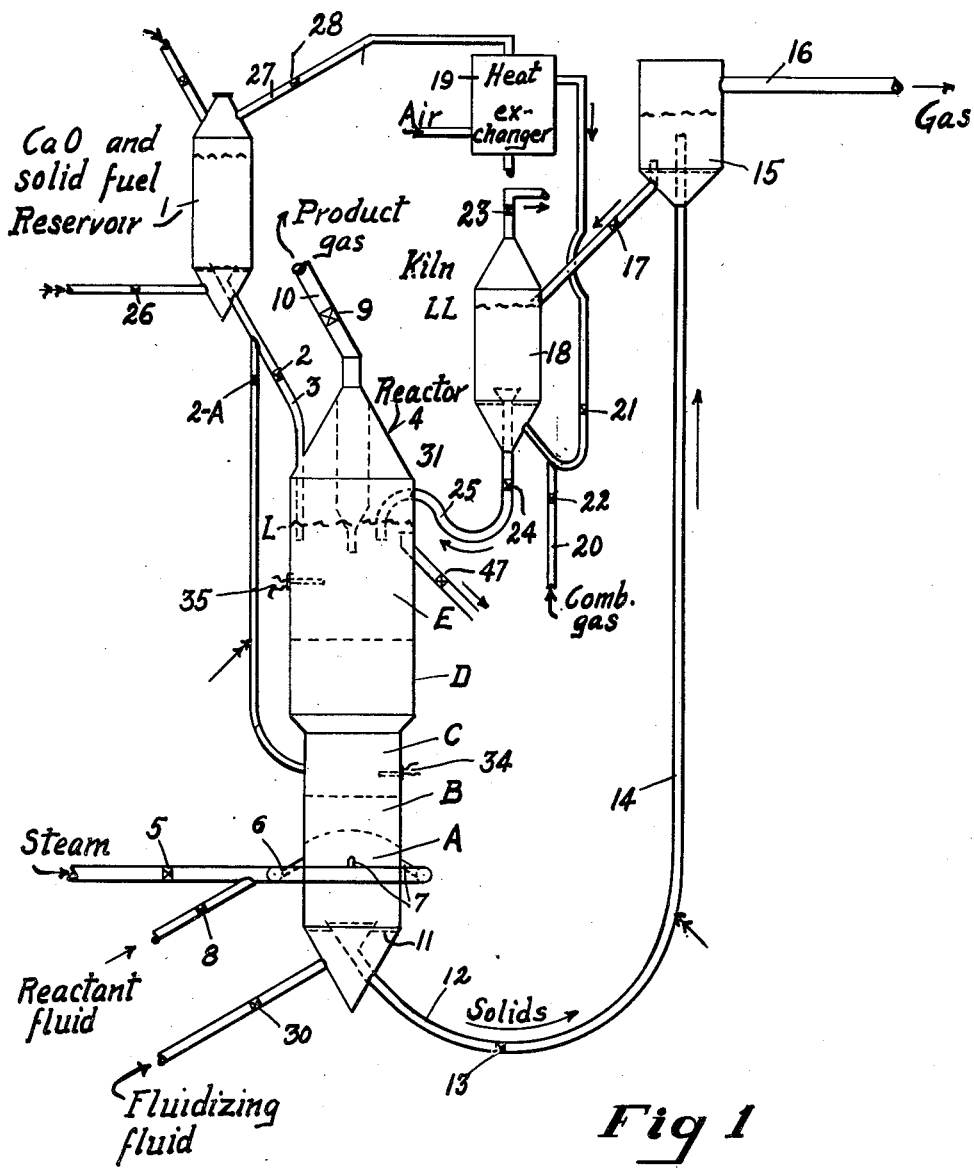

Patented July 1, 1952

2,602,019

UNITED STATES PATENT OFFICE 2,602,019

PROCESS FOR PROMOTING ENDOTHERMIC REACTIONS AT ELEVATED TEMPERATURES

William W. Odell, Washington, D. C.

Application August 23, 1947, Serial No. 770,270

12 Claims. (Cl. 23—1)

This invention relates to a process and apparatus for promoting endothermic reactions at elevated temperatures. In particular, it has to do with the control of the temperature within a mass of fluidized finely-divided solids when promoting endothermic reactions in the said mass at elevated temperatures. More specifically it deals with the promotion of an exothermic reaction in the bed simultaneous with the endothermic reactions whereby a partial or complete equalization of temperature in the fluidized bed results.

In present practice in making combustible gas such as city-gas and in re-forming hydrocarbons by reaction with steam, the reactions are conducted at temperatures of the order of 1800° to 2000° F. or higher and frequently the operation is intermittent, the operation comprising a heating cycle and a gas-making cycle. Many attempts have been made to eliminate the intermittent nature of such operations; one such attempt being the use of mixed oxygen and steam as a gas-making fluid with continuous operation. It has been found that the consumption of oxygen per 1000 cubic feet of gas made is high which results in a high cost for the finished gas.

One of the objects of this invention is to make gas by endothermic reactions at elevated temperatures by passing a gasiform stream upwardly through and in contact with a fluidized mass of small size solids at an elevated temperature and simultaneously promoting exothermic reactions in the mass of fluidized solids by circulating or passing therethrough a substance adapted to react exothermically in said bed; one substance adapted for such circulation is calcium oxide. Another object is to produce combustible gas by endothermic reactions which has a low content of carbon dioxide as it is generated or rather as it is discharged from the generator. Still another object is the production of gas in a fluidized mass of solids substantially continuously by endothermic reactions without the circulation of a large quantity of solids per 1000 cubic feet of gas made. Another object is the reduction in the quantity of oxygen consumed in making gas. A further object is to promote gas-making reactions at elevated temperatures substantially continuously but at lower temperatures than the ash-softening point of the solid fuel employed without the necessity for subsequently scrubbing a large percentage of carbon dioxide from the gas thus produced. Other objects will become apparent by disclosures hereinafter made and by the claims.

In general, the process of this invention in making combustible gas is conducted at temperatures not only appreciably lower than those of the intermittent gas-making processes but at a more uniform temperature than in the latter processes. There is quite a definite relationship between the pressure under which the reactions are conducted and the temperature which may prevail in the bed of fluidized solids in the reactor in which the reactions are promoted; higher temperatures may be employed in the fluidized bed of solids when high pressures are employed. In promoting reactions such as in the gasification of solid fuels while they are in the fluidized state, or in the re-forming of gaseous hydrocarbons by reaction with steam, the reactions are promoted below 1000° C.; when the pressure in the reactor is substantially atmospheric pressure the gas-making temperature therein should be appreciably lower than 900° C. in order to effectively carry out the invention. Inasmuch as calcium oxide (CaO) reacts with water vapor to form a hydrate it is usually essential that the reactions be conducted in the reactor at a temperature above 580° C. Thus, this invention differs from other processes with which I am familiar in that there are maximum and minimum temperatures sharply defined, that the reactions can best be promoted when in contact with fluidized solids which may be confined in a reactor, and when the steam used in promoting reactions requiring steam is at a temperature above about 580° C. as it is introduced into the bed of fluidized solids. Reactions are conducted in such a manner that one of the reaction products is absorbed or removed from the system as formed thus changing the equilibria conditions beneficially. The absorbent (CaO in this example) generates heat during absorption of the $CO_2$ which heat is used in the process. The process further differs from the art, so far as I am aware, in that the so-called absorbent is circulated in a mass of fluidized contact solids in contact with both the solids and the fluid stream initially containing reactant material during the removal of $CO_2$ from the stream. The operation is preferably continuous. Before presenting a detailed description of particular operations it appears to be desirable to mention some general applications of this invention.

It is believed that this method of generating heat in promoting endothermic reactions has particular usefulness as follows:

I. Re-forming hydrocarbons by endothermic reaction at elevated temperatures with $CO_2$, $H_2O$, mixtures of steam with $CO_2$ and/or $O_2$, or other reactant fluids.

II. Production of hydrogen ($H_2$) by re-forming with absorption in the process of the $CO_2$ initially formed.

III. Making city-gas by re-forming hydrocarbons of higher molecular weight than $CH_4$ by reactions which initially yield $CO_2$, $H_2$, $CH_4$ and CO, but with the $CO_2$ content reduced by reaction with CaO; the heat liberated by the latter reaction being utilized in the re-forming reactions.

IV. Reducing or eliminating the need for $O_2$ in making combustible gas by promoting the reaction of $CO_2$ and CaO in the reaction zone of a gas-making device thus generating at least some of the heat required in the gas-making process and simultaneously reducing the $CO_2$ content of the gas.

V. Gasify solid carbonaceous solid fuel at temperatures below the ash-softening point while in the fluidized state with high temperature steam by passing a stream initially comprising steam upwardly in contact with a mass of the fluidized fuel simultaneously contacting both the stream and the fluidized fuel with CaO.

VI. In the relatively low-temperature gasification of solid carbonaceous fuel by reaction with steam, such as by $C+2H_2O=CO_2+2H_2$, the circulation of CaO through the fluidized fuel at a rate adapted to supply at least an appreciable portion of the heat required by the reaction $CaO+CO_2=CaCO_3$ thereby making the process continuous with only the circulation of the refractory material CaO and resulting $CaCO_3$.

VII. Conducting the operations at high pressure in order to employ high T° and simultaneously cause the CaO to absorb $CO_2$; the dissociation pressures of $CaCO_3$ indicate the requirements. At atmospheric pressures CaO will absorb $CO_2$ from gas, when present therein in appreciable amounts, at temperatures as high as 750° C. However, at 900° C. and at atmospheric pressure $CaCO_3$ gives up its $CO_2$. Therefore, in order to conduct the gas-making reactions at a temperature of the order of 900° C. it is necessary to employ superatmospheric pressure, preferably more than 10 atmospheres. The dissociation curve is so steep above 900° C. that the step of employing CaO to generate heat by reacting it with $CO_2$ is not operable at temperatures above 1000° C. or thereabout. Hence, the T° limit for practical purposes is ordinarily about 900° C. under superatmospheric pressure. This T° is below the ash-softening point of substantially all solid fuels and therefore gasification can be conducted at temperatures which avoid clinker troubles. The $CaCO_3$ formed in the process is removed from the reactor or generator, calcined and the resulting CaO again may be circulated through the reactor. The pressure on the calcining system may be lower than in the generator (reactor) when desired, with benefit. The operation may be so conducted (by drawing the $CaCO_3$ out fast enough) that sufficient carbon is present as fuel, associated with the $CaCO_3$ that calcining may be accomplished by air blowing only; otherwise fuel may be used in calcining. Another advantage is: the hot calcined product (CaO) may be returned without cooling, thus saving heat energy. When the CaO thus charged into the reactor is, say at 1100° C. it will function largely as a heat carrying agent until its temperature is reduced therein to 900° C. or lower, according to the pressure in the reactor. It is advantageous to keep the temperature of the CaO as charged to the reactor below the ash-softening point of the solid fuel gasified and usually below 1050° C.

VIII. Cracking hydrocarbons in an atmosphere of steam at temperatures of the order of 580° C. or higher in contact with fluidized solids, which may be catalyst, and with CaO, the cracking conditions being such that $CO_2$ is also initially formed as a result of carbon oxidation; the CaO supplying some of the heat required by the reactions, by combining with $CO_2$.

IX. Adding $CO_2$ to a fluid stream initially containing reactant material, causing the stream to contact hot fluidized solids and react endothermically while contacting also in a fluidized state CaO, and supplying heat to the fluid stream by reaction of the CaO with the $CO_2$.

X. Passing CaO in a state of subdivision into contact with a gasiform medium containing $CO_2$, regulating the relative quantities of the CaO and $CO_2$ contacted per unit of time to generate a given predetermined amount of heat and simultaneously contacting the reacting CaO with reactant material adapted to react endothermically, said predetermined amount of heat being that amount desired to promote the endothermic reaction of said material, and recovering a product of the latter reaction.

XI. Producing unsaturated hydrocarbons from paraffins or other saturated hydrocarbons.

A clear description of the invention can best be made by specific examples and reference to figures.

Figure 1 is a diagrammatic drawing showing in elevation but largely as a flow diagram one form of apparatus in which the process of this invention may be practiced. It is adapted for the gasification of solid fuel in a subdivided state, namely, a state adapted to be fluidized by passing a gasiform stream up through a bed of it. This figure depicts means for introducing CaO at the top and removing $CaCO_3$ from the bottom.

Figure 2:
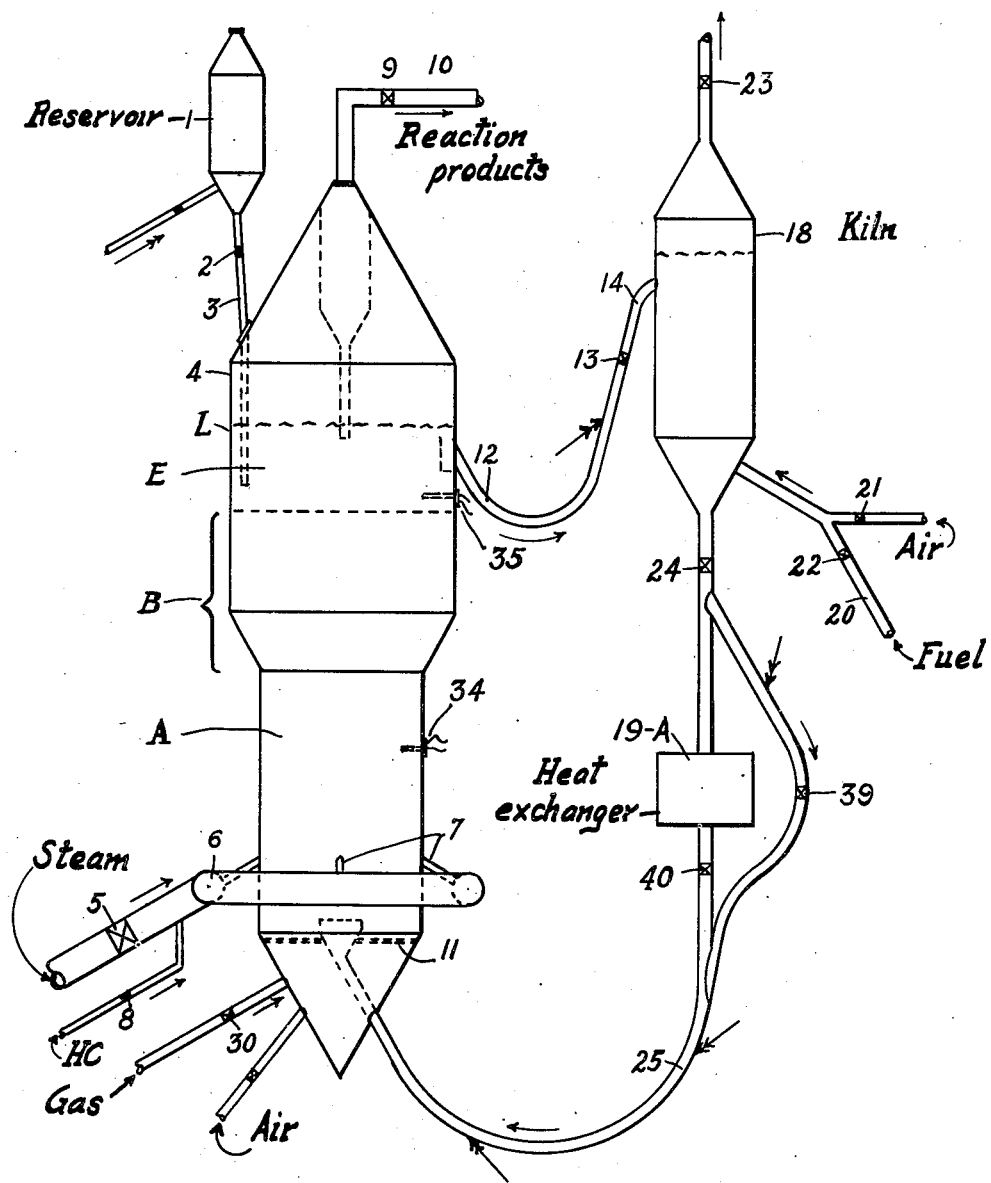

Figure 2 shows similarly and diagrammatically a form of apparatus for practicing the invention in which the CaO is introduced substantially at the bottom of the reactor and the $CaCO_3$ and any excess of CaO is removed from an upper portion of the fluidized bed. This is suitable for relatively low-temperature reactions, i. e., 350° to 650° C. at atmospheric pressure or to higher T° at high pressures, and the reactor may confine catalyst fluidized solids.

Figure 3:
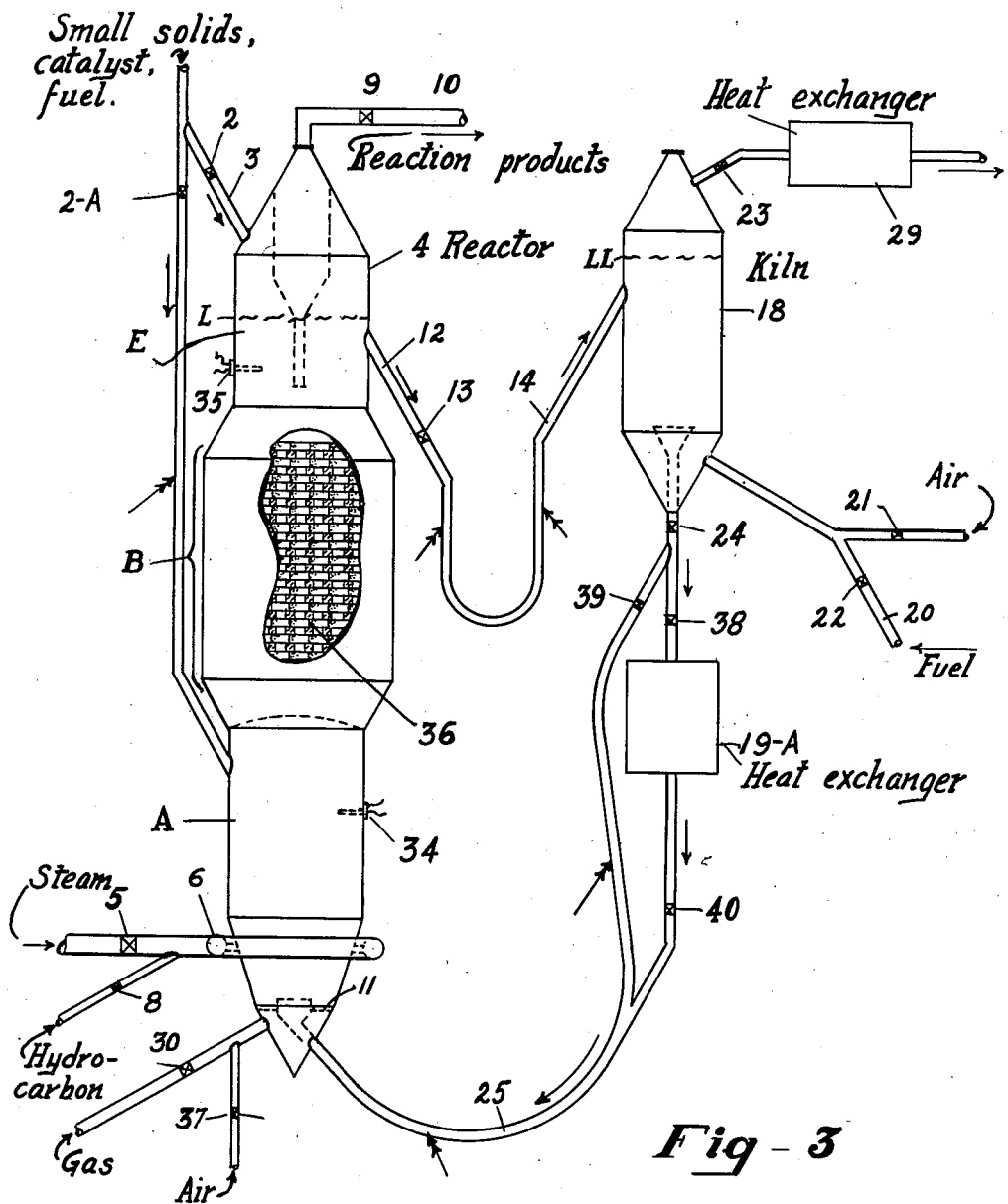

Figure 3 shows diagrammatically in elevation, but somewhat as a flow diagram, a form of apparatus confining arranged and spaced checker bricks; this is a preferred form of the apparatus of this invention. It may be used in re-forming hydrocarbons, gasifying solid fuel, gasifying liquid fuel and promoting other chemical reactions not only those normally endothermic but in special cases (as when CaO is used to treat a gas essentially for the removal of $CO_2$ therefrom) for promoting primarily exothermic reactions.

Figure 4:
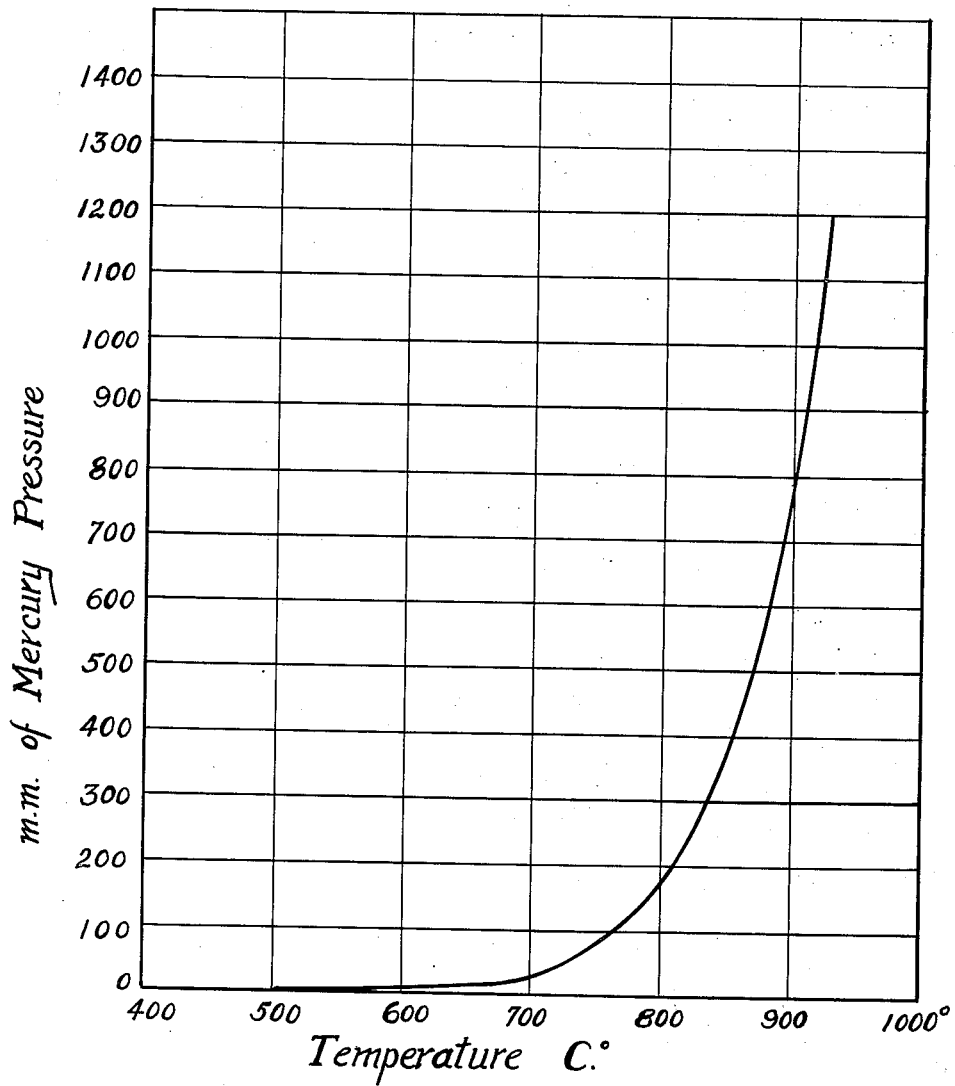

Figure 4 is a graph showing approximately the dissociation pressure of $CaCO_3$ at different temperatures, in millimeters of mercury.

Referring to Figure 1, the reservoir 1 supplies fine size solids which may be solid fuel, catalyst or both, or calcium oxide and solid fuel or other solids, through valve 2 and conduit 3 to reactor 4, whereas steam is admitted thereto through valve 5, pipe 6 and inlets 7. Valve 8 controls the admission of other reactant fluid which may be hot combustible gas or other fluid, and the vapors are discharged from the reactor through valve 9 and conduit 10. The $CaCO_3$ formed in the process is discharged through a specially provided offtake element extending through grid 11 and passes in a substantially fluidized state through conduit 12, valve 13 and conduit 14 to separator 15, the gas and vapor passing out through 16 and the separated $CaCO_3$ discharging through valve 17 into calcining kiln or furnace 18. The $CaCO_3$ is heat treated in 18 preferably by burning combustible gas therein with preheated air from heat-exchanger 19, the gas passing into the furnace through conduit 20, the air and gas control valves being respectively at 21 and 22. The furnace waste gases pass out of 18 through valve 23. When an appreciable amount of $CaCO_3$ is calcined in 18 the stack gases are conducted through a heat exchanger which is not shown in Figure 1. The calcined product, CaO is returned when, as, and if desired, through valve 24 and conduit 25 to reactor 4; this operation may be continuous. The fluidizing stream supplied to reservoir 1 through valve 26 passes out through conduit 27 and valve 28. The levels of solids in 1, 4 and 18 are preferably maintained respectively at LR, L and LL. In all references to this figure it will be understood that the solids in reservoir 1 need not be fluidized in order to practice this invention, the small size solids will flow from 1 to 4 under their own head when pressure equalization in vessels 1 and 4 is provided. The feed of solids from 1 to 4 need not be continuous but may be intermittent. Control valve 30 regulates the rate of supply of fluidizing fluid to the bottom of reactor 4 and dust separator 31 separates dust from the gas stream discharging from the reactor. Five zones are shown in this figure designated as A, B, C, D and E; zones B and D are packed zones, that is, they are filled with solid packing material so disposed in the mass as to afford a plurality of channels for the upward or downward passage of a fluid stream or for the passage of finely divided solids. Control means for supplying finely divided solids from reservoir 1 to zone C of reactor 4 is indicated by control valve 2-A. Thermocouples 34 and 35 are employed to indicate temperatures in the reactor.

Referring to Figure 2, the same system of numbering is employed as in Figure 1. The heat exchanger employed on the circulated solids from the calcining furnace 18 is numbered 19-A in this figure. Three zones are shown lettered A, B and E, the latter corresponding to the top zone of Figure 1 and B is a zone filled with packing material, namely, solids which afford in the aggregate a multiplicity of passageways for fluid and fine size solids to pass from bottom to top or top to bottom of the fluidized bed. The discharge lines and control valve for the $CaCO_3$ leaving reactor 4 are in a different location in this figure but are numbered, as in Figures 1, 12, 14 and 13. Similarly the discharge line from the calcining furnace 18 is located differently but numbered as in Figure 1.

Referring to Figure 3, the same system of numbering has been employed as in Figure 1. The special checker bricks, spaced and arranged in such a manner as to afford a multiplicity of regular channels of chosen diameter, which diameter is preferably in the range 0.75-inch to 2-inches, are shown at 36. A heat exchanger 29 is shown for recovering sensible heat from the blast gases from the calcining furnace 18. The double arrows indicate introduction of a fluidizing gas as may be required.

Referring to Figure 4, the graph shows approximately the change in dissociation pressure of $CaCO_3$ with change in temperature over the range 400° C. (752° F.) to 900° C. (1652° F.) at atmospheric pressure. Thus, it shows that at 1652° F. and at atmospheric pressure the dissociation pressure is about 1 atmosphere. Below this temperature it is less than 1 atmosphere. At superatmospheric pressure in the presence of $CO_2$ the oxide CaO readily combines with the $CO_2$ to form $CaCO_3$ by an exothermic reaction evolving 77,940 B. t. u. This heat energy is utilized in the practice of this invention; the extent to which it takes place at temperatures approximating 1650° F. is largely a function of pressure and $CO_2$ concentration, whereas at temperatures of the order of 1470° F. CaO absorbs $CO_2$ forming $CaCO_3$ quite readily at pressures of a few atmospheres when the gas under pressure contains an appreciable amount of $CO_2$. In some of the reactions which may be promoted within the scope of this invention $CO_2$ is liberated and heat is absorbed, that is, heat must be supplied to promote the reactions. Under these conditions the reactions are conducted under sufficient pressure to evolve at least a very appreciable part of the required heat by the reaction of $CO_2$ with CaO. Under some conditions, particularly when waste $CO_2$ is available, it is an economical method of providing heat and making the operation continuous, using cheap fuel in the calcining operation. This exothermic reaction is conducted under conditions which are unfavorable for the formation of $Ca(OH)_2$ by reaction of CaO with $H_2O$ vapor. Furthermore, the $CaCO_3$ calcined to form CaO is conducted under such conditions that the CaO does not sinter or fuse; the sintered product is not readily reactive with either $CO_2$ or $H_2O$. At 700° C. (1292° F.) the CaO will absorb $CO_2$ even at atmospheric pressure when the $CO_2$ content of the gas is greater than about 3.5 percent; at increased pressure the rate of absorption and the amount of absorption of $CO_2$ forming the $CaCO_3$ increases. This is useful in the low-temperature carbonization of certain solid fuels. When $CO_2$ is introduced into the system adjacent the bottom of the reactor as through valve 8 of Figures 1, 2 and 3, it is part of the fluidizing stream until it is reacted with the CaO.

Some of the results which are obtainable in the practice of this invention are typified by chemical equations as follows:

|  |  | B. t. u. |
| --- | --- | --- |
| (1) | $C+H_2O$ (gas) $=CO+H_2$ | −56,490 |
| (2) | $C+2H_2O$ (gas) $=CO_2+2H_2$ | −38,780 |
| (3) | $CH_4+H_2O$ (gas) $=CO+3H_2$ | −88,690 |
| (4) | $CH_4+2H_2O$ (gas) $=CO_2+4H_2$ | −70,980 |
| (5) | $C_3H_8+2H_2O$ (gas) $=CH_4+2CO+4H_2$ | −129,240 |
| (6) | $C_3H_8+4H_2O$ (gas) $=CH_4+2CO_2+6H_2$ | −90,560 |
| (7) | $C_2H_4+4H_2O$ (gas) $=2CO_2+6H_2$ | −59,190 |
| (8) | $C_2H_4+2H_2O$ (gas) $=2CO+4H_2$ | −95,280 |
| (9) | $2C_2H_4+6H_2O$ (gas) $+2CaO=2CO+10H_2+2CaCO_3$ | +300 |
| (10) | $CH_4+2CaO=4H_2+CaCO_3$ | +6,920 |
| (11) | $CH_4+2H_2O$ (gas) $+CO_2+2CaO=4H_2+2CaCO_3$ | +84,820 |
| (12) | $C_2H_4+4H_2O$ (gas) $+2CaO=6H_2+2CaCO_3$ | +96,610 |
| (13) | $C+2H_2O$ (gas) $+CaO=2H_2+CaCO_3$ | +39,120 |
| (14) | $CO_2+CaO=CaCO_3$ | +77,900 |
| (15) | $C_3H_8+4H_2O$ (gas) $+2CaO=CH_4+6H_2+2CaCO_3$ | +65,240 |
| (16) | $3C+5H_2O$ (gas) $+2CaO=CO+5H_2+2CaCO_3$ | +21,750 |
| (17) | $5C+\frac{1}{2}O_2+6H_2O$ (gas) $+$ $2CaO=3CO+6H_2+2CaCO_3$ | +12,460 |
| (18) | $4C_3H_8+11H_2O$ (gas) $+1.5 O_2+$ $4CaO=2CH_4+6CO+23H_2+4CaCO_3$ | +8,540 |

The swell in gas volume is from 4 volumes of propane to 31 volumes of gas.

$C_3H_8$ consumed per 1000 cubic feet of gas made=129 cubic ft.
$O_2$ consumed per 1000 cubic feet of gas made=48.5 cubic ft.
Steam consumed per 1000 cubic feet of gas made=17.0 pounds.
CaO consumed (converted to $CaCO_3$) per 1000 cubic feet of gas made=20.0 pounds.

Theoretical gas composition: Based on use of pure $O_2$

| | |
|---|---|
| CO | 19.3 |
| $H_2$ | 74.2 |
| $CH_4$ | 6.5 |
| | 100.0 |

B. t. u. (gross) per cubic foot=370.

Actually operating with commercially pure materials there is a small amount of $CO_2$ in the gas, a small amount of $N_2$ and very small amounts of illuminants and ethane.

(19) $C_4H_{10}$ contacting hot fluidized solids at a temperature of the order of 580° C. particularly in the presence of steam and of $CO_2$ reacting with CaO yielding $C_3H_6$, $C_2H_4$, $H_2$, $CH_4$ and $CaCO_3$. This, like many other reactions can be made continuous by so controlling the temperature of the inlet and outlet gas stream by economizing steps that the reaction of CaO with $CO_2$ generates all the heat energy required. If and when the heat losses, such as through the exit of gases at high temperature, are excessive heat must be supplied in order to conduct the reactions. This heat may be supplied by the use of $O_2$, by intermittently heating the solids in the reactor or by adding $CO_2$ to the reactant gas stream and circulating CaO to react with it.

*Example 1*

Carbonizing lignite and recovering char and gaseous products. The following description is applicable to the treatment of other low-rank fuels and certain oxidized coking coals, and certain non-coking coals.

Referring to Figure 1, finely crushed lignite, size one-sixteenth inch and smaller, is fed from reservoir 1 through valve 2-A to reactor 4 until a deep bed forms therein after which valve 2-A is closed and superheated steam at a temperature above about 1070° F. is introduced through valve 5, pipe 6 and ports 7 at a velocity adapted to fluidize the lignite. The steam and volatile products are removed from the reactor through separator 31, 9 and 10. This is continued and the level of the fluidized lignite is raised almost to L by opening valve 2-A. It will be found that the gases evolved by the lignite contain a very appreciable amount of $CO_2$. When the temperature in the mass of fluidized lignite is about 1100° to 1200° F. and the temperature of the gas stream leaving the reactor is above about 1000° F. CaO is introduced by opening valve 24 and the level of the mixed solids is brought up to L. The particles of CaO thus introduced into 4 are preferably about one-eighth inch to one-sixteenth inch size. The operation is now under way and it will be found that the CaO particles slowly migrate to the bottom of reactor 4 and the carbonized lignite hereinafter called "char" migrate to the top of the fluidized bed. In traveling down through the reactor the CaO combines with $CO_2$ liberating heat and forming $CaCO_3$; the heat is used in carbonizing the lignite. Now the valve 13 is opened sufficiently to allow the $CaCO_3$ to pass from 4 through 12 and 14 to 15 and the calcining furnace 18. Likewise, the calcined product is returned to 4 at an equal rate by opening valve 24 under control. This circulation of lime is continued and the rate is adjusted in accordance with the $CO_2$ initially evolved during carbonization of the lignite and in accordance with the temperature effect desired. A Dakota lignite, when heated to a carbonizing temperature, yields gas having a composition substantially as follows:

Percent by volume

| | |
|---|---|
| $CO_2$ | 20.0 |
| Illuminants | 1.2 |
| CO | 14.0 |
| $H_2$ | 48.8 |
| $CH_4$ | 14.0 |
| $N_2$ | 2.0 |
| | 100.0 |

The yield of this gas is 5200 cubic feet per ton of raw lignite. Thus, the $CO_2$ in the gas from 2000 pounds of lignite is 1040 cubic feet. If sufficient CaO is circulated to react with the $CO_2$ and it removes 75 percent of the $CO_2$ or 1500 cubic feet, the amount of heat liberated in accordance with equation (14) is 309,120 B. t. u. This amount of heat is enough to carbonize dried lignite. Thus, when lignite is roughly heat treated by known means to reduce its water content to substantially the dry state the dried product can be carbonized continuously, by internally applied heat and a high yield of byproducts obtained without inert dilution common to other methods of internal heating. It will be found that when a very appreciable excess of CaO is employed or a mixture of CaO and other heat carriers are employed and they are introduced hot into the reactor, additional heat is available for carbonization and under these conditions it is not necessary to dry the lignite before treatment. When the operation is well under way it is advisable to discontinue the blasting with superheated steam and blast with hot gas, preferably the lignite gas which has been freed of tar and condensable matter. Thus, in this example the operation comprises circulating solids $\frac{1}{16}$ to $\frac{1}{8}$-inch size which include CaO, while still hot from a calcining furnace to an upper portion of a bed of fluidized carbonaceous solids initially about $\frac{1}{16}$-inch and less in size, passing the former solids downwardly through the latter bed removing them, subjecting them to the action of heat at a temperature above about 950° C. (1742° F.) and recirculating meanwhile maintaining the bed fluidized in the reactor 4 by blasting it with a gasiform fluid from a lower zone of said bed, while adding fresh carbonaceous solids to be treated substantially continuously to a zone of said bed below the top zone and substantially continuously removing the carbonized product as through valve 47 from the top zone of said bed; the gaseous products of reaction are discharged as a continuous stream overhead.

*Example 2*

Removal of $CO_2$ from gases containing appreciable amounts of $CO_2$ simultaneous with the removal of certain sulfur compounds if present and also gums and resins if present.

Referring to Figure 3, and following technique substantially as described, only in this example the reactor 4 contains as fluidized solids only CaO along with solid products of reaction such as $CaCO_3$. The CaO, preferably in a fine state of division such as 80 to 100 mesh or finer, is fluidized, hot, in reactor 4 by passing a stream of the gas to be treated into 4 by opening valve 30 sufficiently to maintain the powdered lime in a fluidized state resembling a boiling liquid. The gas stream is conducted out of 4 through valve 9 and outlet 10. It is preferable to conduct this operation under superatmospheric pressure, say 10 atmospheres and at a temperature of the order of 600° to 700° C. (1112° to 1292° F.) although lower temperatures or even higher temperatures could be used. Treating a gas having a composition as follows:

| | Percent by volume |
|---|---|
| $CO_2$ | 20.0 |
| $CO$ | 10.0 |
| $H_2$ | 60.0 |
| $N_2+CH_4$ | 10.0 |
| | 100.0 | yields in this particular case a gas having a composition substantially as follows:

| | Percent by volume |
|---|---|
| $CO_2$ | 2.0 |
| $CO$ | 12.3 |
| $H_2$ | 73.4 |
| $N_2+CH_4$ | 12.3 |
| | 100.0 |

This represents a removal of approximately 183.5 cubic feet of $CO_2$ per 1000 cubic feet of raw gas treated. With a deep bed of fluidized lime in a fine state of division the $CO_2$ content can be reduced to substantially zero although in order to accomplish this it is necessary to employ superatmospheric pressure in reactor 4 and to maintain the temperature, in at least the uppermost zone of the fluidized CaO solids, at a relatively low level, below about 600° C. The amount of CaO theoretically required to remove the 183.5 cubic feet of $CO_2$ is 27.2 pounds and the amount of heat evolved is approximately 38,300 B. t. u. The total heat above 60° F. in the 816.5 cubic feet of outlet gas resulting from treating 1000 cubic feet of the raw gas at 1200° F. is only 16,330 B. t. u. hence, it is evident that more heat is available by virtue of the lime reaction than is dissipated as sensible heat in the outgoing gases when at 1200° F. This excess heat can be removed by known cooling means, by circulating an excess of CaO, by circulating other solids with the CaO or by other means. The raw gas fed to the reactor need not be preheated in this example. A cooling surface provided within the upper portion of reactor 4 would be helpful in this particular example. It is understood that the CaO is supplied to 4 through valve 24 and that it reacts forming $CaCO_3$ in the reactor and that the $CaCO_3$ is discharged from 4 through 12, 13 and 14 and conducted to the calcining furnace 18 where it is calcined and the resulting CaO is recirculated back to the reactor 4.

Numerous modifications of this procedure may be practiced and they will be recognized by one skilled in the art. One such modification pertaining to this example of treating gases is as follows: Finely divided reactive carbon or coke may be circulated with the CaO, removing some of it with the $CaCO_3$ for use as fuel in the calcining operation. Compounds removed with this carbon are burned in the calcining furnace. Again, a catalyst or an oxide of iron may be fluidized in the reactor and the gas to be treated may be passed up through this bed and the lime caused to circulate upwardly as described concurrently with the gas stream. Heat exchanger 19-A may be used or bypassed according to the temperature effect desired and to the amount of $CO_2$ in the gas being treated.

*Example 3*

Manufacture of city-gas by reaction of hydrocarbons with steam; applicable to low molecular weight hydrocarbons particularly such materials as $C_2H_6$, $C_3H_8$, $C_4H_{10}$, natural gasoline, petroleum refinery gas and the like.

A natural gasoline comprising largely propane and butane yields gas having a calorific value varying from about 450 B. t. u. per cubic foot to 1000 B. t. u. or more depending on: (a) velocity of the stream of fluids through the reaction zone, (b) the depth of the bed of fluidized solids in the reaction zone, (c) the mean temperature of the solids in the latter zone, (d) the composition of the hydrocarbon feed stock, (e) the pressure in the reaction zone, (f) the nature of the solids fluidized, (g) the temperature of the reactants fed to the reactor, and (h) the amount of CaO circulated through the reactor per unit of time.

Referring to Figure 3, the procedure is as follows: Heat the checker bricks 36 in the reactor 4 by burning gas admitted through 30 with air admitted through 37, removing the products of combustion through 9 and 10 until the bricks are heated to incandescence. Discontinue the gas and air blasting and fill the reactor about 0.5 to 0.6 full of the solids to be fluidized, coarse sand in this particular instance. Superheated steam is now admitted through valve 5 and the vaporized gasoline at a temperature of the order of 400° to 800° F. is admitted through valve 8. Additional fluidizing medium is supplied through valve 30 and this may be recirculated gaseous reaction products, natural gas or other fluid. The superficial velocity of the total stream in the upper portion of zone A is approximately 0.5 to 6.0 feet per second. CaO is now introduced through 24 to bring the total volume of fluidized solids to level L. All of the gases are withdrawn through 9 and 10. The CaO in this example is of finer size than the sand. The operation is now under way except that valve 13 is adjusted to circulate $CaCO_3$ through 12 and 14 to calcining furnace 18 wherein it is calcined and the resulting CaO continuously returned to the reactor in a fluidized state through conduit 25. In the calcining operation gas is burned in counter-current flow in 18 by admitting gas through 22 and air (preferably preheated) through 21, the products of combustion passing out through 23. There is little advantage in cooling the CaO in exchanger 19-A in this particular operation, hence this exchanger is bypassed in this example by closing valves 38 and 40 and opening 39. The temperatures in zones A and E are watched, and should the temperature in A fall too low for yielding gas of sufficiently low calorific value it may be corrected by:

(a) Circulating more CaO (hot) from 18 to 4, or (b) Introducing some combustion supporting fluid through valve 37, or (c) Raising the temperature of the steam admitted through 5, or (d) Decreasing the rate of flow of fluids through reactor 4, or (e) Combinations of these procedures.

It will be found that as the temperature in reactor 4 rises the amount of CO plus $H_2$ formed increases and the B. t. u. of the gas made decreases. At the low level of operating temperature range there is a tendency for some propane to pass through the reactor undecomposed. For making city-gas it is usually desirable to maintain the temperature in the upper portion of zone A above 600° to about 735° C. (1112° to 1355° F.) The pressure in the reactor in this example may be in the approximate range 1 to 5 atmospheres. Higher temperature than 1335° F. is desired in zone A for the efficient conversion of steam and the effective production of $CO_2$ for reaction with the CaO; at the higher temperatures the reaction of a hydrocarbon with steam is favored but the reaction of CaO with $CO_2$ is not favored. Fortunately there is a temperature gradient from the bottom to the top of the reactor so that hydrocarbon re-forming can be conducted at about 900° C. (1652° F.) in zone A when the CaO is circulated as calcining temperatures to the reactor and the CaO passing up through zones B and E decreases in temperature to the level where it does react with $CO_2$. Pressure above atmospheric is very helpful under these conditions. It will be understood that in operating at temperatures at which the steam-hydrocarbon reaction is very slow the $CO_2$ required for generating heat may not be generated, the major reactions being cracking. When this condition is desired the $CO_2$ needed may be added, that is, introduced along with the reactant gasoline vapors or it may be generated by combustion by allowing a controlled amount of combustion supporting gas to pass into the reactor during operation, as through valve 31. The difference in the temperatures in the top and bottom of the bed in reactor 4 is probably due to the fact that cracking occurs in zones above as well as in zone A. This temperature difference favors the use of high temperatures in zone A without destroying the benefits accruing from the CaO reaction with $CO_2$ in the upper, cooler region of the reactor. Calculated on the basis of per 1000 cubic feet of gas made, the quantities of materials consumed under one set of conditions with maximum temperatures in the range 1400° to 1600° F. are substantially as follows:

Propane reacted per 1000 cu. ft. of gas made_____ cu. ft.____130
Butane reacted per 1000 cu. ft. of gas made_____ cu. ft.____130
Steam reacted per 1000 cu. ft. of gas made_____ lbs.____12
$CO_2$ added per 1000 cu. ft. of gas made_____ cu. ft.____78
CaO reacted per 1000 cu. ft. of gas made_____ lbs.____25

The composition of the gas is:

| | Percent by volume |
|---|---|
| $CO_2$ | 1.3 |
| CO | 7.8 |
| $H_2$ | 49.3 |
| $CH_4$ | 13.0 |
| $C_2H_6$ | 2.6 |
| $C_2H_4$ | 20.8 |
| $C_3H_6$ | 5.2 |
| | 100.0 |

Calorific value, B. t. u. per cu. ft. _____ 815

By reducing the amount of steam the amount of CO can be reduced to substantially zero and the hydrogen content of the gas made can be reduced to 25 to 35 percent. The gas under these conditions is largely a result of cracking in the presence of $CO_2$ and CaO and comprises hydrogen, methane, ethane and ethylene with some propylene. The ratio of ethane to ethylene increases as the pressure in the system is increased.

Two important modifications of operations in operating procedure may be made within the scope of Example 3 for the purpose of altering the composition of the product gas or for increasing production capacity. One comprises promoting some combustion in the bottom zone of reactor 4 by the substantially continuous introduction of $O_2$, air or oxygen-enriched air, thus supplying some of the heat required for the reactions by combustion reactions and simultaneously forming some of the $CO_2$ needed to generate heat by reaction with CaO. The other modification is the promotion of chiefly catalytic cracking reactions in reactor 4 maintaining the temperature by circulating hot CaO from the calcining furnace to the reactor and introducing enough $CO_2$ to zone A to give the desired temperature; in this modification the temperature will usually be in the range 932° F. to 1292° F. which range is favorable for reaction of CaO with $CO_2$. Pressure also favors the latter reaction. A cracking catalyst may be used in this case instead of coarse sand; the catalyst should be coarse and preferably denser than the CaO, that is, the specific gravity of the catalyst particles preferably should be greater than that of the CaO particles. The CaO rises in the fluidized bed forming $CaCO_3$ which is removed along with any excess CaO from zone E.

In making city-gas from butane when the yield and separate recovery of propylene and/or ethylene is of minor importance it is desirable to maintain a temperature of 700° to 800° C. (1292° to 1472° F.) in zone A of Figure 3 and to employ a mass of fluidized small size solids in said zone sufficient to allow a residence time of the reacting fluid therein of 4 to 1 second. On the other hand, when it is desirable to make the maximum amount of propylene, for example, the residence time should be shorter or the temperature lower. My experiments cracking butane show that at about atmospheric pressure a very high yield of unsaturated hydrocarbons results when the cracking temperature is within the range 700° to 775° C. (1292° to 1395° F.) and the residence time in the cracking zone A is approximately 4 to 2 seconds. At pressures appreciably above atmospheric pressure the residence time may be increased or the temperature increased or both but it is preferable to keep the temperature below about 1395° C. and increase the residence time to provide the desired cracking effect; this may be done by adjusting the depth of the bed of fluidized solids and/or adjusting the velocity of the fluid stream.

It will be evident that other reactions than those given in the specific examples can be promoted within the confines of this invention and it may also be apparent that the CaO which is caused to circulate up through reactor 4 of Figure 3 can readily be caused to flow in the opposite direction. In general, when the fluidized solids other than CaO have a specific gravity appreciably greater than that of CaO the circulation of the CaO should be upwardly in the reactor and vice versa. Counter flow circulation of two streams of fluidized solids in a common bed are indicated in Figure 2. It is usually desirable to react the $CO_2$ at a temperature above about 300° C. and as low as is compatible with the major reactions promoted.

With adjustment of the manner of introducing fluidizing gas into the circulating system and adjustment of relative pressures and/or bed levels in reactor 4 and in chamber 18 the direction of flow of $CaCO_3$ from 4 and of CaO to 4 can be reversed. The checker bricks are a marked aid in promoting separation of the fluidized mixed solids in the reactor, in equalizing temperatures therein and in providing a controllable residence time of the circulating solids in reactor 4. The diameter of the vertical flues in the mass of arranged and spaced checker bricks shown at 36 in Figure 3 should preferably be in the range 0.75 to 1.5 inches although good results may be obtained with spacing somewhat greater or less than these dimensions. Checker bricks are arranged preferably in staggered formation, that is, arranged so that the vertical flues or channels are not continuous through the packed zones, as for example, through 36 of Figure 3. Although the arrangement of bricks in reactor 4 of Figure 3 is shown for simplicity in flue formation, staggered formation is generally preferred.

Before defining the claims of this invention, attention is called to the fact that the present invention is a special case involving some of the principles described in a co-pending case, Serial Number 582,692, filed by me in the United States Patent Office March 14, 1945, now Patent No. 2,503,291. Regularly spaced and arranged channels are provided in the generator in Figures 1, 2 and 3 whereby temperatures in the fluidized bed are controlled even though segregation into layers occurs. The lime travels through the bed and through the latter channels largely by virtue of its difference in specific gravity from that of other small solids simultaneously fluidized in said bed. When the fluidized bed comprises lime alone the $CaCO_3$ should be removed, preferably from the cooler end of the bed and preferably from the top of said bed and the CaO which has a greater specific gravity should be fed to the generator adjacent the bottom of said bed. When a large excess of CaO is employed this latter detail is sometimes less important.

The examples given above are for the purpose of illustrating the procedure in practicing this invention; many possible variations within the scope of the disclosures will become evident to one skilled in the art. One can readily alter the temperature in the bed, the temperature of the reactant material fed thereto, the nature of reactants employed, their rate of feed, the amount of diluent employed, the amount of combustion-supporting gas supplied, the pressure in the system, the kind of catalyst used and other variables and obtain modified results.

Reference has been made to the use of CaO as the absorbent for $CO_2$; other alkali earth oxides may be used under some conditions or even other reactant substance, but CaO is usually preferred. It is noted that the dissociation temperatures of the other carbonates are different from that of $CaCO_3$.

Having thus described my invention so that one skilled in the art can practice it, I claim:

1. The process of promoting endothermic chemical reaction at temperatures below about 925° C. but above about 300° C. in an elongated vertical reaction zone containing a body of checker bricks intermediate the ends thereof and a continuous, deep mass of finely divided contact solids extending from below to above said body of checker bricks, which comprises, passing a gasiform stream initially containing at least one material adapted to react endothermically at the temperature of said zone upwardly through said mass of solids at a superficial velocity sufficient to fluidize said mass as a continuous, deep, dense bed having a well defined top level while said solids are at a temperature within the aforesaid range, feeding a stream of finely divided solids containing CaO and having different buoyancy than the contact solids into a portion of said bed outside of said body of checker-bricks, passing the latter solids initially containing said CaO through said bed and through the interstitial spaces of said body to that portion of said bed on the other side of said body and reacting said CaO with $CO_2$ present in the said zone during such passage to form $CaCO_3$ and generate heat, the thus generated heat promoting the endothermic reaction of the material adapted to react endothermically, withdrawing $CaCO_3$ from the portion of said bed to which it is passing, and discharging the fluid stream containing gasiform products of said endothermic reaction from above said bed.

2. The process defined in claim 1 in which the endothermic reaction of said material is promoted in said zone under a super-atmospheric pressure of the order of 1 to 150 atmospheres.

3. The process defined in claim 1 in which the contact solids are catalytic to the endothermic reaction of said material.

4. The process defined in claim 1 in which the CaO is excess of the chemical equivalent of the $CO_2$ to form $CaCO_3$ in the reaction zone.

5. The process defined in claim 1 in which the CaO is fed to said bed at an elevated temperature but below about 1100° C.

6. The process defined in claim 1 in which the gasiform stream initially contains at least 2 reactants adapted to react with one another endothermically at temperatures below 925° C. and in which said reactants are caused to react with one another in the reaction zone in said bed.

7. The process defined in claim 1 in which, said contact solids are combustible carbonaceous substances, the gasiform stream initially comprises essentially superheated steam and in which $CO_2$ as a product of reaction is generated in the reaction zone.

8. The process defined in claim 1 in which the checker-bricks are spaced 0.75 to 2.0 inches apart in said, body forming regular, small channels therein for the passage of said gasiform stream therethrough.

9. The process defined in claim 1 in which the said material is a hydrocarbon.

10. The process defined in claim 1 in which a relatively small amount of a combustion supporting fluid is supplied to the bottom portion of said bed along with and as a part of said gasiform stream and in which some combustion of fuel is promoted in that portion of said bed for the purpose of supplying some of the heat consumed by the endothermic reaction and for generating $CO_2$ in said bed.

11. The process defined in claim 1 in which the gasiform stream that is fed to said bed in the said zone is preheated to about 400° to 800° F.

12. The process of promoting chemical reactions at temperatures below about 925° C. but above about 300° C. in an elongated vertical reaction zone containing a body of spaced checker-bricks intermediate the ends thereof and a continuous deep mass of finely divided contact solids extending from below to above said body of checkerbricks, which comprises passing a gasiform stream initially containing $CO_2$ upwardly through said mass of solids at a superficial velocity sufficient to fluidize said mass as a continuous deep, dense bed having a well defined top level while said solids are at a temperature within the aforesaid range, feeding a stream of finely divided solids which solids are initially essentially CaO having a different buoyancy than the contact solids into a portion of said bed outside of said body of checker bricks, passing the stream of CaO solids through the bed and through the interstitial spaces of the body to that portion of said bed on the other side of said body and reacting said CaO with the $CO_2$ initially present in said gasiform stream in the zone during such passage to form $CaCO_3$ and generate heat, thus subjecting said gasiform stream to the action of said heat in contact with said CaO and simultaneously removing $CO_2$ therefrom, withdrawing $CaCO_3$ from the portion of said bed to which it is passing and discharging the resulting fluid stream from above said bed.

WILLIAM W. ODELL.

REFERENCES CITED

The following references are of record in the file of this patent:

UNITED STATES PATENTS

| Number | Name | Date |
|---|---|---|
| 1,938,202 | Williams | Dec. 5, 1938 |
| 2,425,754 | Murphree et al. | Aug. 19, 1947 |
| 2,444,990 | Hemminger | July 13, 1948 |
| 2,456,072 | Marisic | Dec. 14, 1948 |

OTHER REFERENCES

Murphree et al. "The Oil and Gas Journal," March 3, 1945, page 64.